March 18, 1930.        M. S. CHAMBERLAIN        1,750,744
ROTARY CORE BIT
Filed Sept. 22, 1926
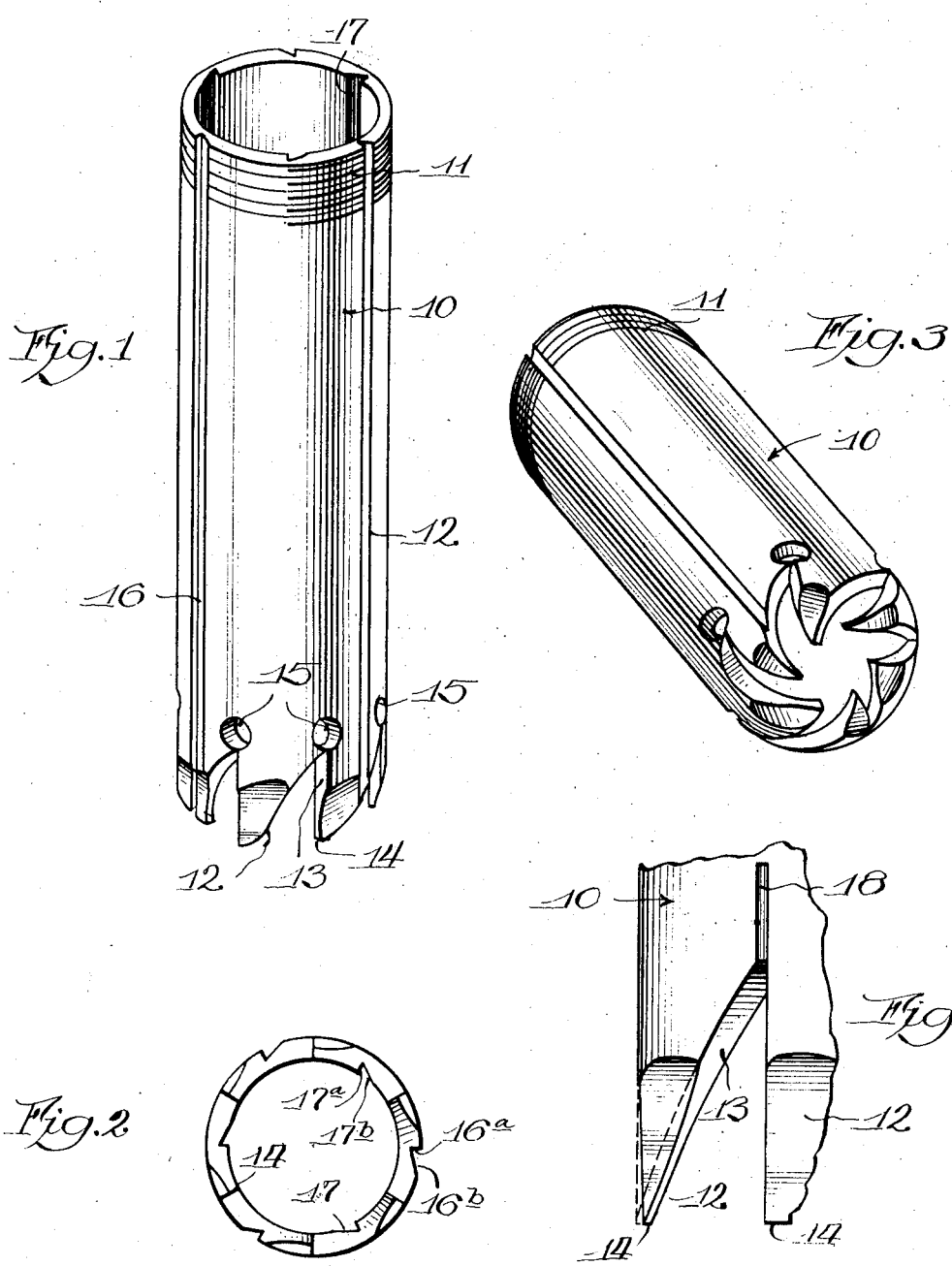

Patented Mar. 18, 1930

1,750,744

UNITED STATES PATENT OFFICE

MAURICE S. CHAMBERLAIN, OF MALVERN, ARKANSAS

ROTARY CORE BIT

Application filed September 22, 1926. Serial No. 136,987.

My invention relates to improvements in rotary core bits.

The principal object of the invention is to provide an improved bit which is adapted to cut a suitable core and thereafter to sever the core and carry the same from the well when the bit is withdrawn.

Another object is to provide a bit which will permit the desired circulation of water on the outside of the bit and also on the inside thereof with little likelihood of interruption during the drilling operations.

A further object is to provide a bit which can be manufactured at a very small cost so that after being used but once for cutting and lifting a core, the bit can be discarded.

Other objects relate to various features of construction which will become apparent from a consideration of the following specification and accompanying drawings wherein Fig. 1 is a perspective view illustrating a form of the invention.

Fig. 2 is a bottom plan view of the bit shown in Fig. 1.

Fig. 3 is a perspective view showing the teeth of the bit bent inwardly to core lifting position, and Fig. 4 is an enlarged view of a portion of a bit, illustrating one tooth thereof in detail.

In the drawings the bit 10 is shown as comprising a tubular body which has threads 11 at its upper end for engagement with the collar of a rotary drill stem (not shown) the lower end of the bit being provided with teeth 12. The teeth have cutting faces 13 terminating in the cutting edges 14, which portions of the teeth may be tempered as desired. A portion of each tooth is beveled downwardly and from the forward or cutting face to the rear of the tooth. It will be seen that as only a portion of the cutting face is removed adequate cutting surface remains. The bevel however is such that the component of a force exerted downwardly on the drill rod and bit will cause the teeth to bend inwardly to form the basket bottom shown in Fig. 3. The dotted lines in Fig. 4 indicate the outline of a tooth before being beveled.

During the drilling operation the pressure is insufficient to bend the teeth from normal position but when it is desired to remove the core, sufficient pressure is applied to the drill stem by any suitable means to cause the teeth 12 to bend inwardly as above described, the drill being rotated during the application of the additional pressure, thus causing the teeth to sever the core as they bend to close the end of the bit. The bottom thus formed will support the core when the drill is lifted from the well.

To facilitate the bending of the teeth 12 as described, openings 15 may be provided at the base of and communicating with each space between adjacent teeth. The openings serve in effect to elongate each tooth and render bending of the same somewhat easier.

It is necessary that the cuttings be removed during the drilling operations and as this removal is usually effected by means of water, I have provided channels 16 in the outer surface of the drill for carrying water to the teeth and inner channels 17 for carrying water and ground rock, etc., upwardly past the core. As will be seen, the channels 16 and 17 have walls 16ª and 17ª respectively, which are disposed substantially in diametrical planes of the bit, and other walls 16ᵇ and 17ᵇ respectively extending oppositely to the direction of rotation of the drill. This formation of the channels prevents the vertical edges thereof from acting as scraping or cutting edges and thus collecting material which might prevent proper circulation of water to and from the teeth.

In lieu of the drilled openings 15, a slit may extend upwardly from the base of each space such as shown at 18 in Fig. 4. These slits which may be but saw kerfs will serve to render the teeth more easily bent.

It will be seen that the construction of the bit is simple and capable of being manufactured at small cost. In some cases for instance, the tubular bodies may be made from standard pipe, depending on the character of the material being drilled.

Although I have shown and described certain features of my improvements for the purpose of illustration, it will be apparent that various changes may be made therein without departing from the spirit of the invention as defined in the appended claims.

What I claim as new is:

1. A rotary core bit comprising a body having beveled teeth, said body having openings therein adjacent the base of said teeth for facilitating the inward bending of said teeth by a force acting on the beveled surfaces thereof.

2. A rotary core bit comprising a body having beveled teeth adapted to be bent inwardly by a force acting on the beveled surfaces to sever the core and retain the same in said body, said body having longitudinal channels therein for permitting water to circulate to and from said teeth during the rotation of the bit.

3. A rotary core bit comprising a body having teeth adapted to be bent inwardly to sever the core and retain the same in said body, said body having inner and outer channels for conveying water to and from said teeth during the rotation of said bit, said channels being defined by walls so disposed with reference to the respective surfaces of said body as to form non-scraping edges thereby minimizing the accumulation of foreign matter within the channels.

In testimony whereof, I have subscribed my name.

MAURICE S. CHAMBERLAIN.